United States Patent [19]
Burrows

[11] Patent Number: 6,129,645
[45] Date of Patent: Oct. 10, 2000

[54] CHAIN TENSION ADJUSTMENT ASSEMBLY FOR A BICYCLE

[75] Inventor: Mike Burrows, Norfolk, United Kingdom

[73] Assignee: Giant Manufacturing Co., Ltd., Taichung Hsien, Taiwan

[21] Appl. No.: 09/298,780

[22] Filed: Apr. 23, 1999

[51] Int. Cl.$^7$ .................................. F16H 7/10; F16H 7/14
[52] U.S. Cl. ............................................. 474/112; 474/116
[58] Field of Search ................................... 474/101, 112, 474/113, 116

[56] References Cited

U.S. PATENT DOCUMENTS 5,820,503  10/1998  Bruchner et al. .................... 474/112
5,888,159   3/1999  Liao ...................................... 474/116
6,058,845   5/2000  Kelm .................................... 474/112

Primary Examiner—David Fenstermacher
Assistant Examiner—Matthew A. Kaness
Attorney, Agent, or Firm—Harness, Dickey & Pierce, P.L.C.

[57] ABSTRACT

A bicycle chain tension adjustment assembly includes a clamping member and a clamped member. The clamping member is attached to a rear bracket in which a rear shaft of a rear wheel hub of a bicycle is mounted, and has left and right ends and an inner annular wall with an annular cam surface of an adjustable dimension so as to be placed at tightening and loosening positions. The clamped member extends rightwardly of the right end of the rear shaft, and has a peripheral wall with an axis that is offset from the axis of the rear shaft to mate with the annular cam surface when the annular cam surface is in the tightening position.

4 Claims, 3 Drawing Sheets

CHAIN TENSION ADJUSTMENT ASSEMBLY FOR A BICYCLE

FIELD OF THE INVENTION

The invention relates to a chain tension adjustment assembly, more particularly to a bicycle chain tension adjustment assembly that permits tension adjustment of a bicycle chain without the need to dismantle a rear shaft of a rear wheel from a rear bracket of the bicycle frame.

BACKGROUND OF THE INVENTION

A bicycle includes a seat tube with a bottom bracket disposed at a bottom portion, a crank axle mounted rotatably on the bottom bracket, a chain wheel mounted on the crank axle, a chain stay disposed to extend rearwardly from the bottom bracket in a longitudinal direction, a seat stay which has an upper end connected to the seat tube and a lower end formed with the chain stay to define a rear bracket, a rear shaft disposed to extend in a transverse axis and which has left and right ends secured relative to the chain stay, a rear wheel hub mounted rotatably on the rear shaft between the left and right ends, a free wheel disposed on the rear wheel hub, and a chain trailed over the chain wheel and the free wheel to transmit rotation of the chain wheel to the rear wheel hub.

A disadvantage of the aforesaid bicycle resides in that whenever the rider wishes to adjust the tension of the chain, the rear shaft must be loosened relative to the chain stay and moved relative to the chain wheel prior to the tightening operation. Two hands must be used in order to hold two ends of the rear shaft during the chain tension adjustment operation in order to avoid misalignment of the rear shaft relative to the transverse axis, thereby inconveniencing the rider.

SUMMARY OF THE INVENTION

Therefore, the object of this invention is to provide a bicycle chain tension adjustment assembly in which the chain can be conveniently adjusted with the use of a single hand.

Accordingly, the chain tension adjustment assembly of this invention is used in a bicycle which includes a seat tube with a bottom bracket disposed at a bottom portion of the seat tube, a crank axle mounted rotatably on the bottom bracket, a chain wheel mounted on the crank axle, a chain stay disposed to extend rearwardly from the bottom bracket in a longitudinal direction, a seat stay which has an upper end connected to the seat tube and a lower end formed with the chain stay to define a rear bracket, a rear shaft disposed to extend in a first transverse direction and which has a first axis, a first left end and a first right end secured relative to the chain stay, a rear wheel hub mounted rotatably on the rear shaft between the first left and right ends, a free wheel disposed on the rear wheel hub proximate to the first right end, and a chain trailed over the chain wheel and the free wheel to transmit rotation of the chain wheel to the rear wheel hub. The chain tension adjustment assembly includes a clamping member and a clamped member. The clamping member is adapted to be attached to the rear bracket, and has second left and right ends in the first transverse direction, and an inner annular wall that extends in the first transverse direction and that is opened at the second left and right ends. The inner annular wall defines an annular cam surface of a dimension that is adjustable in the longitudinal direction so as to be placed at tightening and loosening positions. The clamped member is disposed to extend rightwardly of the first right end of the rear shaft, and has a second axis adapted to be offset to the first axis, and a cam portion with a peripheral wall disposed to be radial to and around the second axis to mate with the annular cam surface such that the cam portion is slidably rotatable relative to the annular cam surface when the annular cam surface is in the loosening position.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
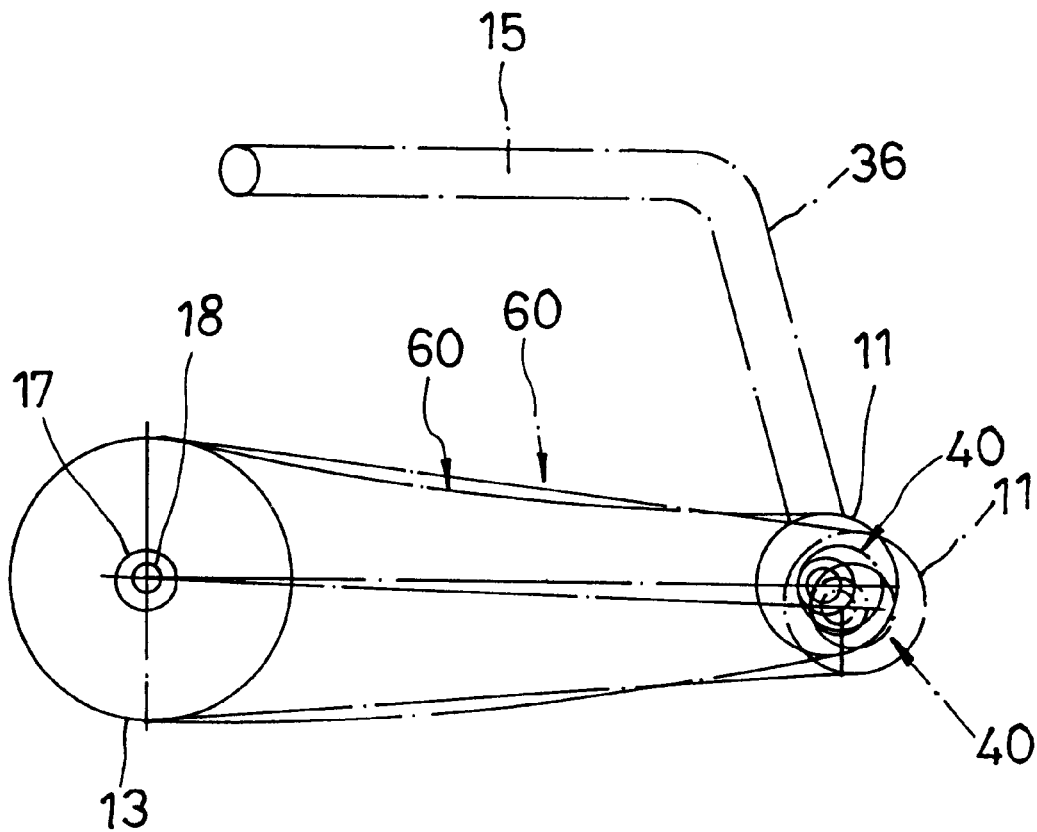
FIG. 1 is a side view of the preferred embodiment of a chain tension adjustment assembly of this invention when used in a bicycle.
Figure 2:
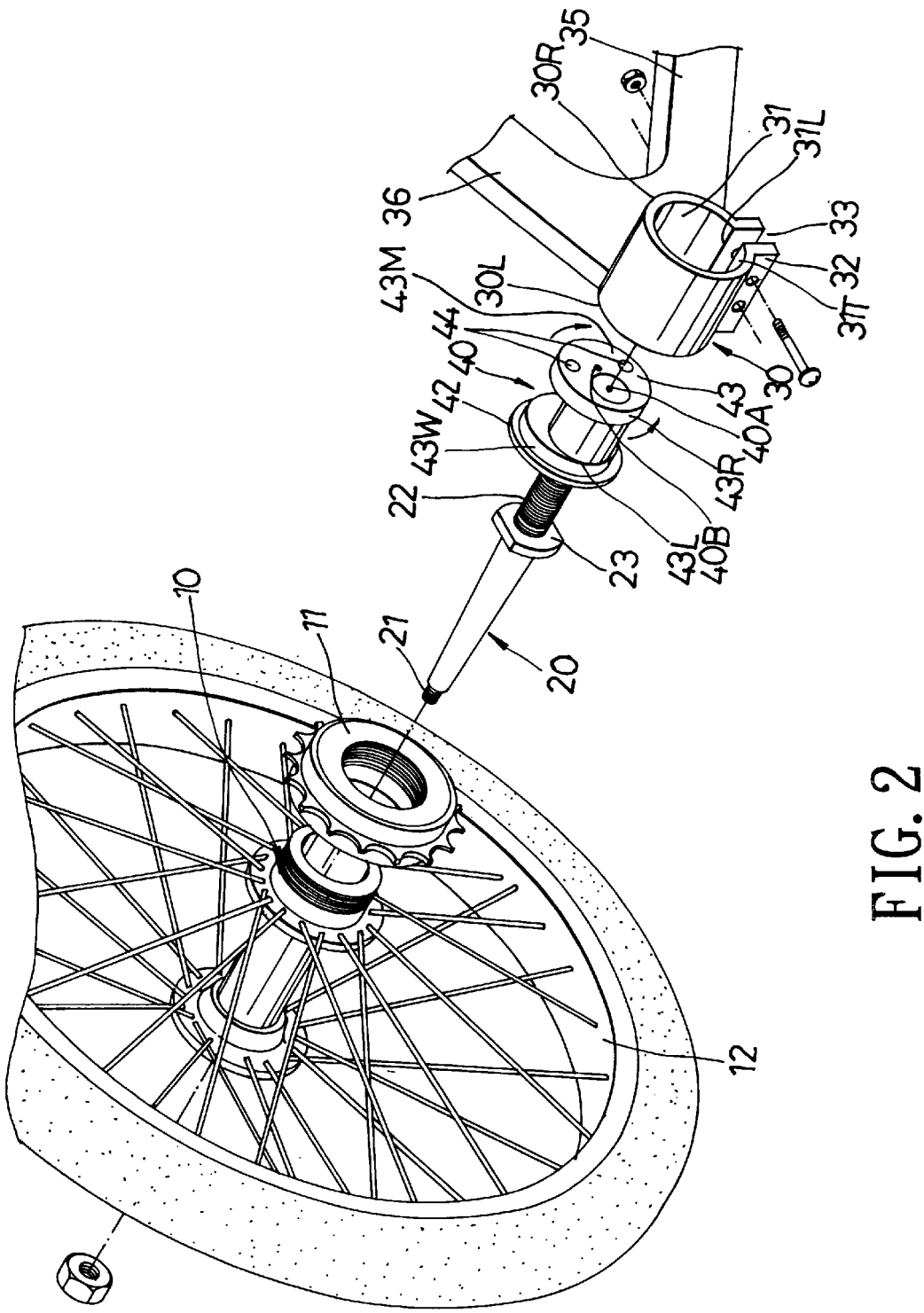
FIG. 2 illustrate how the chain tension adjustment assembly of the preferred embodiment mounted on the bicycle.

Referring to FIGS. 1 and 2, the preferred embodiment of a chain tension adjustment assembly of this invention is used in a bicycle which includes a seat tube 15 with a bottom bracket 17 disposed at a bottom portion of the seat tube 15, a crank axle 18 mounted rotatably on the bottom bracket 17, a chain wheel 13 mounted on the crank axle 18, a chain stay 35 disposed to extend rearwardly from the bottom bracket 17 in a longitudinal direction, a seat stay 36 which has an upper end connected to the seat tube 15 and a lower end formed with the chain stay 35 to define a rear bracket, a rear shaft 20 disposed to extend in a first transverse direction and has a first axis, a left end 21 and a right end 23 secured relative to the chain stay 35, a rear wheel hub 10 mounted rotatably on the rear shaft 20 between the left and right ends 21, 23, a free wheel 11 disposed securely on the rear wheel hub 10 proximate to the right end 23 thereof, and a chain 60 trailed over the chain wheel 13 and the free wheel 11 to transmit rotation of the chain wheel 13 to the rear wheel hub 10. The chain tension adjustment assembly includes a clamping member 30 and a clamped member 40.

As illustrated, the clamping member 30 is adapted to be attached to the rear bracket of the bicycle frame, and has left and right ends 30L, 30R in the first transverse direction, and an inner annular wall 31 that extends in the first transverse direction and that is opened at the left and right ends 30L, 30R. The inner annular wall 31 defines an annular cam surface of a dimension that is adjustable in the longitudinal direction so as to be placed at tightening and loosening positions.

The clamped member 40 is adapted to extend rightwardly of the right end of the rear shaft 20, and has a second axis adapted to be disposed offset to the first axis 40A, and a cam portion 43 with a peripheral wall 43W disposed to be radial to and around the second axis 40B to mate with the annular cam surface such that the cam portion 43 is slidably rotatable relative to the annular cam surface when the annular cam surface is in the loosening position.

In this embodiment, the inner annular wall 31 has lead and tail ends 31L, 31T spaced apart from each other in the longitudinal direction with a clearance 33 therebetween. The clamping member 30 further has front and rear lugs 32 integrally formed with and extending outwardly and respectively from the lead and tail ends 31L, 31T respectively in a second transverse direction which is transverse to both the first transverse direction and the longitudinal direction. A fastening member retainingly brings the front lug 32 toward the rear lug 32 in the longitudinal direction so as to adjust the dimension of the annular cam surface.

The peripheral wall 43W includes left and right peripheral portions 43L, 43R that are spaced apart from each other in the first transverse direction and that are disposed to mate respectively with corresponding parts of the annular cam surface. An annular stopper 42 is disposed to extend radially and outwardly from the left peripheral portion 43L and distal to the right peripheral portion 43R so as to abut against the left end 30L of the clamping member 30 to prevent further extension of the cam portion 43 interiorly of the clamping member 30 when the clamped member 40 is brought in the first transverse direction so as to permit the cam portion 43 to be clamped in the inner annular wall 31.

In this embodiment, the clamped member 40 includes a rightmost wall 43M disposed to be normal to the second axis and cooperating with the right peripheral portion 43R to form a peripheral juncture. The rightmost wall 43M has a pair of insert bores 44 which extend in the first transverse direction and which are disposed at a position offset to the first axis 40A so as to be adapted to be inserted and driven by a tool 70 (see FIG. 3). The fastening member includes a plurality of locking screws 50 that extend threadedly through the front and rear lugs 32. The left and right peripheral portions 43L, 43R cooperate to define a shaft mounting hole around the first axis 40A and that extends in the first transverse direction.

The right end 23 of the rear shaft 20 is preferably formed with a threaded coupling end 22 so as to be threaded in the shaft mounting hole of the clamped member 40.

Figure 3:
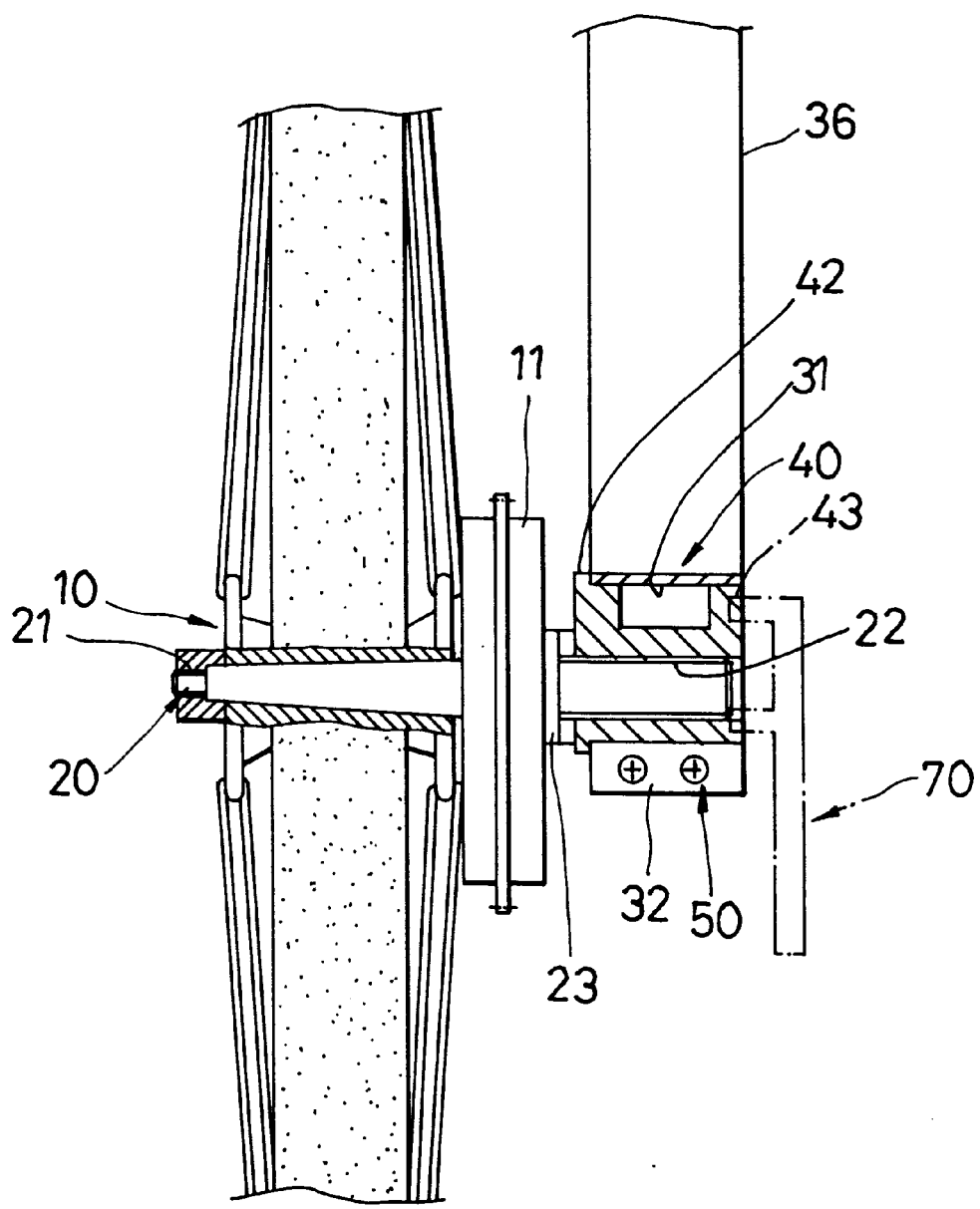
FIG. 3 illustrates how a clamped member is moved relative to a clamping member employed in the chain tension adjustment assembly.

Referring to FIGS. 1 and 3, when it is desired to adjust tension of the chain 60, the front and rear lugs 32 are loosened relative to each other. Two keys of the tool 70 are inserted into the insert bores 44 (see FIG. 2) so as to rotate the cam portion 43 in the inner annular wall 31. Rotation of the cam portion 43 in the inner annular wall 31 will permits movement of the clamped member 40 relative to the clamping member 30, which, in turn, results in movement of the rear shaft 20 relative to the crank axle 17, thereby achieving the tension adjustment of the chain 60.

With this invention thus explained, it is apparent that numerous modifications and variations can be made without departing from the scope and spirit of this invention. It is therefore intended that this invention be limited only as indicated in the appended claims.

I claims:

1. A chain tension adjustment assembly for a bicycle, the bicycle including a seat tube with a bottom bracket disposed at a bottom portion of the seat tube, and a crank axle mounted rotatably on the bottom bracket, a chain wheel mounted on the crank axle, a chain stay disposed to extend rearwardly from the bottom bracket in a longitudinal direction, a seat stay having an upper end connected to the seat tube and a lower end formed with the chain stay to define a rear bracket, a rear shaft disposed to extend in a first transverse direction and having a first axis, a first left end and a first right end secured relative to the chain stay, a rear wheel hub mounted rotatably on the rear shaft between the first left and right ends, and a free wheel disposed on the rear wheel hub proximate to the first right end, and a chain trailed over the chain wheel and the free wheel to transmit rotation of the chain wheel to the rear wheel hub, the chain tension adjustment assembly being characterized by:

a clamping member adapted to be attached to the rear bracket, and having second left and right ends in the first transverse direction, and an inner annular wall extending in the first transverse direction and being opened at the second left and right ends, the inner annular wall defining an annular cam surface of a dimension that is adjustable in the longitudinal direction so as to be placed at tightening and loosening positions; and a clamped member adapted to extend rightwardly of the first right end of the rear shaft (20), and having a second axis adapted to be disposed offset to the first axis, and a cam portion with a peripheral wall disposed to be radial to and around the second axis to mate with the annular cam surface such that the cam portion is slidably rotatable relative to the annular cam surface when the annular cam surface is in the loosening position.

2. The chain tension adjustment assembly as defined in claim 1, characterized in that the inner annular wall has lead and tail ends spaced apart from each other in the longitudinal direction with a clearance therebetween, the clamping member further having front and rear lugs integrally formed with and extending outwardly and respectively from the lead and tail ends in a second transverse direction which is transverse to both the first transverse direction and the longitudinal direction, and a fastening member for retainingly bringing the front lug toward the rear lug in the longitudinal direction so as to adjust the dimension of the annular cam surface.

3. The chain tension adjustment device as defined in claim 1, characterized in that the peripheral wall includes left and right peripheral portions spaced apart from each other in the first transverse direction and disposed to mate respectively with corresponding parts of said annular cam surface, and an annular stopper disposed to extend radially and outwardly from the left peripheral portion and distal to the right peripheral portion so as to abut against the second left end of the clamping member to prevent further extension of the cam portion interiorly of the clamping member when the clamped member is brought in the first transverse direction so as to permit the cam portion to be clamped in the inner annular wall.

4. The chain tension adjustment assembly as defined in claim 3, further characterized in that the clamped member includes a rightmost wall (43M) disposed to be normal to the second axis and forming a peripheral juncture with the right peripheral portion (43R), the rightmost wall (43M) having an insert bore (44) therein which extends in the first transverse direction and which is at a position offset to said first axis so as to be adapted to be inserted and driven by a tool.

* * * * *